US011208002B2

(12) United States Patent
Noh

(10) Patent No.: US 11,208,002 B2
(45) Date of Patent: Dec. 28, 2021

(54) APPARATUS AND METHOD FOR CONTROLLING CHARGING A HIGH VOLTAGE POWER GRID STRUCTURE OF A VEHICLE

(71) Applicants: Hyundai Motor Company, Seoul (KR); Kia Motors Corporation, Seoul (KR)

(72) Inventor: Jeong-Ha Noh, Gyeongsangnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 229 days.

(21) Appl. No.: 16/690,751

(22) Filed: Nov. 21, 2019

(65) Prior Publication Data
US 2020/0391606 A1    Dec. 17, 2020

(30) Foreign Application Priority Data

Jun. 13, 2019    (KR) .......................... 10-2019-0070295

(51) Int. Cl.
| | |
|---|---|
| *H02J 7/00* | (2006.01) |
| *H02J 7/14* | (2006.01) |
| *B60L 53/62* | (2019.01) |
| *B60L 58/10* | (2019.01) |
| *B60L 53/16* | (2019.01) |
| *B60L 53/67* | (2019.01) |

(52) U.S. Cl.
CPC ............... *B60L 53/62* (2019.02); *B60L 53/16* (2019.02); *B60L 53/67* (2019.02); *B60L 58/10* (2019.02); *H02J 7/0013* (2013.01); *H02J 7/0045* (2013.01); *H02J 7/0047* (2013.01); *B60L 2240/547* (2013.01)

(58) Field of Classification Search
USPC .......................................................... 320/139
See application file for complete search history.

(56) References Cited

U.S. PATENT DOCUMENTS

| | | | |
|---|---|---|---|
| 9,099,866 B2* | 8/2015 | Seaman | H02J 3/00 |
| 2017/0207637 A1* | 7/2017 | Sugeno | H02J 7/0048 |
| 2017/0274784 A1* | 9/2017 | Nagakura | H02M 3/33569 |
| 2017/0305284 A1* | 10/2017 | Koh | B60L 53/60 |
| 2017/0305289 A1* | 10/2017 | Meitinger | B60L 53/62 |

FOREIGN PATENT DOCUMENTS

KR    10-2011-0090184 A    11/2012

* cited by examiner

*Primary Examiner* — Alexis B Pacheco
(74) *Attorney, Agent, or Firm* — Mintz Levin Cohn Ferris Glovsky and Popeo, P.C.; Peter F. Corless

(57) ABSTRACT

A method for controlling charging of a high voltage power grid structure of a vehicle is provided. The method includes measuring battery voltage of a vehicle and transmitting the measured voltage to a first charger. Output voltage of the first charger is matched with the transmitted voltage and provided to a charging controller via communication between the charging controller and the first charging port to which the first charger is coupled. The vehicle is then charged by connecting a high-voltage relay to be connected to a first charging port to which the first charger is coupled. The process is repeated while the vehicle is being charged between the charging controller and a second charger by connecting to a second charging port to which a second charger is coupled.

15 Claims, 7 Drawing Sheets

APPARATUS AND METHOD FOR CONTROLLING CHARGING A HIGH VOLTAGE POWER GRID STRUCTURE OF A VEHICLE

CROSS-REFERENCE TO RELATED APPLICATIONS

This application claims priority under 35 U.S.C. § 119 to Korean Patent Application No. 10-2019-0070295, filed on Jun. 13, 2019, the disclosure of which is incorporated herein by reference in its entirety.

BACKGROUND

1. Field of the Invention

The present invention relates to a method for controlling charging a high voltage power grid structure of a vehicle, and particularly, to a scheme for connecting a vehicle equipped with a large-capacity battery to a charger for rapid charging.

2. Description of the Related Art

An electric vehicle charging system may be defined as a system for charging a battery mounted within an electric vehicle using power from a grid or an energy storage device of a commercial power source. The electric vehicle charging system may have various forms according to the type of electric vehicle. For example, the electric vehicle charging system may include a conductive charging system using a cable or a non-contact wireless power transmission system. When it is necessary to charge the battery in a traveling electric vehicle, the electric vehicle drives to a charge station capable of charging the electric vehicle or a ground assembly (GA) located in charging spots along a traveling route.

When the electric vehicle is charged, a vehicle assembly (VA) mounted on the electric vehicle forms induction resonance coupling with a transmission pad of the ground assembly and electric power transmitted from the ground assembly through flow resonance coupling is charged into a high voltage battery of the electric vehicle. Therefore, many electric vehicles have a reception pad for induction resonance coupling with the transmission pad. In this regard, a developed technique in the related art discloses a charging system for charging the electric vehicle and a method for providing the charging system.

However, in the related art, charging is delayed in case of the high-voltage battery because a single charging port installed for each vehicle is mounted to charge a plurality of electric vehicles and the charging is only capable of being performed in a one-to-one scheme between a charger and a vehicle.

SUMMARY

The present invention has been made in an effort to overcome a shortening limitation of a charging time and provides a charging control method of a high voltage power grid structure.

An exemplary embodiment of the present invention provides a method for controlling charging of a high-voltage power grid structure of a vehicle, which may include: measuring, by a charging controller, a battery voltage of a vehicle and transmitting the measured voltage to a first charger; matching output voltage of the first charger with the voltage transmitted from the charging controller and notifying the charging controller of the matching voltage via communication between the charging controller and the first charging port to which the first charger is coupled; performing, by the charging controller, charging of the vehicle by connecting a high-voltage relay to be connected to a first charging port to which the first charger is coupled; and repeating, while the vehicle is being charged, the above-described processes between the charging controller and the second charger by connecting to a second charging port to which a second charger is coupled as a charging port connected to the first charging port in parallel.

In addition, spark with a charging port additionally connected in parallel may be prevented by matching supply voltages of the first charging port and the charging controller. The charging controller may be connected to the first charging port to connect the second charging port or an N-th charging port during charging. Even when the N-th charging port is connected to the charging controller, the processes may be repeated.

An apparatus for controlling charging of a high-voltage power grid structure of a vehicle through multiple charging ports may include: a first high-voltage charging relay connected in series to a first charging port; a second high-voltage charging relay connected in series to a second charging port; and an N-th high voltage charging relay connected in series to an N-th charging port. The first high-voltage charging relay, the second high-voltage charging relay, and the N-th high-voltage charging relay may be connected in parallel and connected in series to nodes to which multiple high-voltage battery packs are connected in parallel.

An apparatus for controlling charging of a high-voltage power grid structure of a vehicle through multiple charging ports may include: a first main relay connected in series between a first charging port and a first high-voltage battery; a first relay connected between the first charging port and the first high-voltage battery in parallel to the first main relay; a second main relay connected in series between a second charging port and a second high-voltage battery; and a second relay connected between the second charging port and the second high-voltage battery in parallel to the second main relay. The first relay and the second relay may further include resistors connected in series. The first relay operates and then the first main relay operates or the second relay operates and then the second main relay operates and positive electrodes of the first high-voltage battery and the second high-voltage battery may be connected.

An apparatus for controlling charging of a high-voltage power grid structure of a vehicle through multiple charging ports may include: a first main relay connected in series between a first charging port and a first high-voltage battery; a second main relay connected in series between a second charging port and a second high-voltage battery; and an OBC relay in which each of the first charging port and the second charging port is connected to an on board charger (OBC) and respective OBCs are commonly connected and the OBC relay may be commonly connected between the first main relay and the first high-voltage battery and between the second main relay and the second high-voltage battery.

According to an exemplary embodiment of the present invention, when a plurality of charging ports are mounted on an electric vehicle and charging is started by connecting the remaining charging ports while charging is proceeding through one charging port, component damage due to a spark caused due to a potential difference between the charging ports and generation of inrush current may be prevented.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1A:
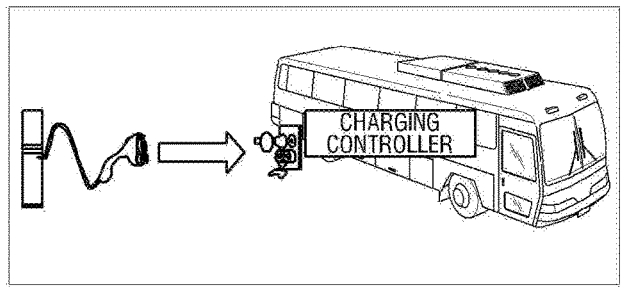
FIGS. 1A-1C illustrate an exemplary embodiment of each circuit structure connected in series with a charging scheme of a large-capacity battery in the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described in detail with reference to contents disclosed in the accompanying drawings. However, the present invention is not restricted or limited by exemplary embodiments. Like reference numerals presented in each drawing refer to elements that perform substantially the same functions.

Objects and effects of the present invention may be naturally appreciated or clearer by the following description and the objects and effects of the present invention are not limited only by the following description. Further, in describing the present invention, a detailed description of known technologies associated with the present invention may be omitted when it is determined that the detailed description may unnecessarily obscure the subject matter of the present invention.

Figure 1B:
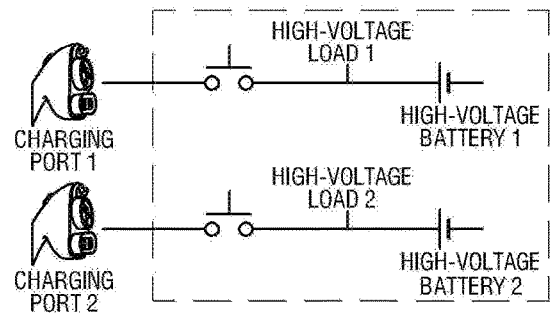
Figure 1C:
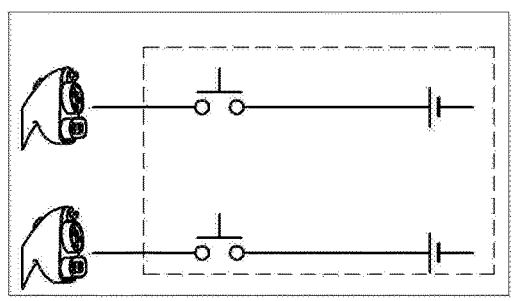

FIGS. 1A-1C illustrate an exemplary embodiment of each circuit structure connected in series and in parallel with a charging scheme of a large-capacity battery in the related art. Referring to FIG. 1, FIG. 1A illustrates one charging port mounted on a vehicle equipped with a large capacity battery and the charging port and a vehicle are charged in one to one scheme and FIGS. 1B and 1C illustrate an exemplary embodiment in which a plurality of charging ports are connected to the vehicle and each charging port and a high-voltage battery are connected in series.

In FIGS. 1A to 1C, when charging is performed by connecting only a first charging port, battery 2 is not charged and charging amounts of high-voltage batteries 1 and 2 may be different from each other. As a result, a problem in operation of the battery may occur and a user should consider which charging port of charging ports 1 and 2 should be charged and how much to charge the corresponding charging port.

When the charging is performed through a second charging port simultaneously to the charging being performed through the first charging port, there is a different end time in the charging, which causes inconvenience and each of high-voltage load 1 and high-voltage load 2 should be configured while discharging. As a result, when a motor controller unit (MCU) is connected to high-voltage battery 1 and a cooling compressor is connected to high-voltage battery 2, complexity of an entire high-voltage configuration may increase.

Figure 2:
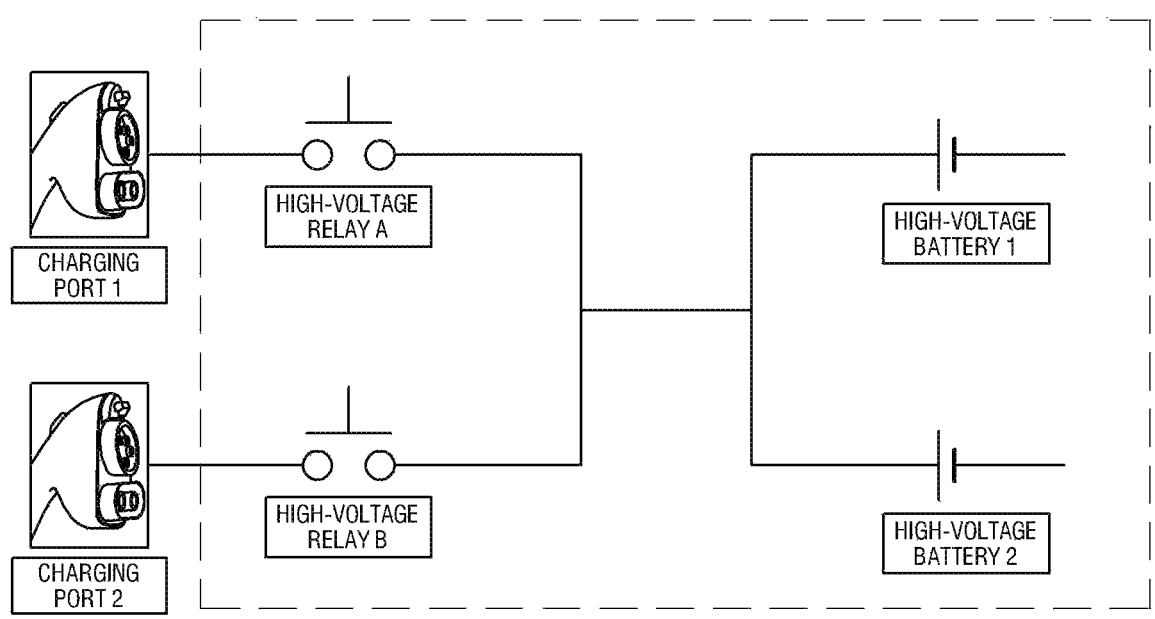
FIG. 2 illustrates a parallel structure of a charging control circuit of a high-voltage power grid structure of a vehicle to which a logic according to an exemplary embodiment of the present invention may be applied.

FIG. 2 illustrates a parallel structure of a charging control circuit of a high-voltage power grid structure of a vehicle to which a logic of the present invention may be applied. According to the circuit structure illustrated in FIG. 2, the high voltage batteries 1 and 2 may be uniformly charged even though the charging is performed through either the first charging port or the second charging port to solve problems of a serial scheme and it may be possible to fully charge both the high voltage batteries 1 and 2 according to a situation even if only one charger exists. The problem does not occur due to the difference in charging amount between the high-voltage batteries 1 and 2 and a high-voltage common load may be used, and as a result, a simple high-voltage power grid may be configured as if there is one high-voltage battery.

When FIG. 2 is configured, problems of a serial scheme of FIGS. 1A to 1C described above may be solved, but when a plurality of charging ports is connected, a problem such as component damage may occur due to generation of spark and inrush current when starting the charging through another charging port while the charging is in progress through any one charging port. Accordingly, the logic of the present invention may be applied to a parallel circuit configuration of FIG. 2.

In other words, when the charging is attempted through the second charging port like the logic of the present invention while the charging is in progress through the first charging port, the spark is not generated due to the difference between charging voltage and voltage supplied by a second charger, thereby resolving a possibility of damage to equipment and vehicles due to the spark.

When charging the first charging port, vehicle-side voltage and output-side voltage of the charger may be adjusted to the same level through a pre-charge process and then a vehicle-side relay A may be closed. Accordingly, the generation of the spark and the inrush current due to the potential difference between both sides may be prevented.

In the present invention, even though the charging of the vehicle is started through the second charging port while the vehicle is being charged through the first charging port by using the pre-charge process of the first charging port for the second charging port, the generation of the spark and the inrush current at the time of closing a high-voltage relay B may be prevented by maintaining the potential difference between the second charging port and the vehicle-side power grid equally, thereby facilitating simultaneous charging.

Figure 3:
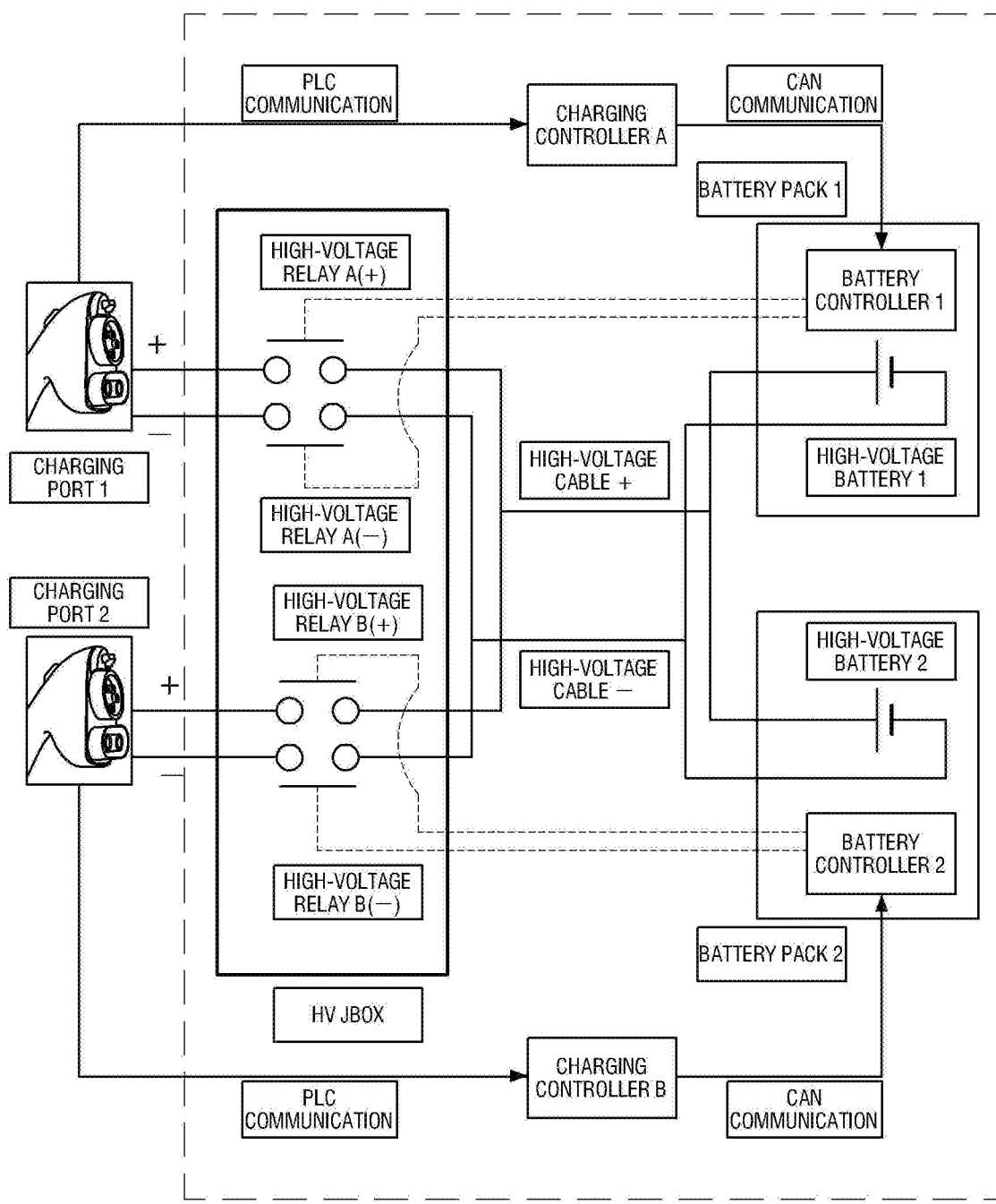
FIG. 3 illustrates a high-voltage power grid structure of a vehicle according to an exemplary embodiment of the present invention to which the circuit of FIG. 2 is applied.

FIG. 3 illustrates a high-voltage power grid structure of a vehicle to which the circuit of FIG. 2 is applied. Referring to FIG. 3, in main components, a high-voltage fuse, a High Voltage Junction Box (HV JBOX) which may be formed by high-voltage relays, a battery pack constituted by a high-voltage battery (e.g., a set of cells) and a battery controller (e.g., a battery management system (BMS)), and a charging controller and each cable, a relay, and the like may be connected.

The present invention may include: a first high-voltage charging relay connected in series to the first charging port; a second high-voltage charging relay connected in series to the second charging port; and an N-th high-voltage charging relay connected in series to an N-th charging port and the first high-voltage charging relay. The second high-voltage charging relay, and the N-th high-voltage charging relay may be connected in parallel, and as a result, multiple high-voltage battery packs may be connected in series to nodes that are connected in parallel.

Since signal protocols of the charger (e.g., power line communication (PLC)) and the battery controller (e.g., controller area communication (CAN)) are different from each other, the charging controller may be configured to convert a PLC signal into a CAN signal or vice versa to provide an interface of communication between the charger and the battery controller. According to an exemplary embodiment of the present invention, the charging controller may include the charging controller and the battery controller.

The charging controller may include a high-voltage cable presenting an in-vehicle high-voltage charge/discharge path and a high-voltage relay opening/closing a high-voltage flow. The first charging port and the second charging port may be included in one charger and installed in each charger. Further, in the present invention, the number of charging ports may be extended to N chargers through the charging controller.

Figure 4:
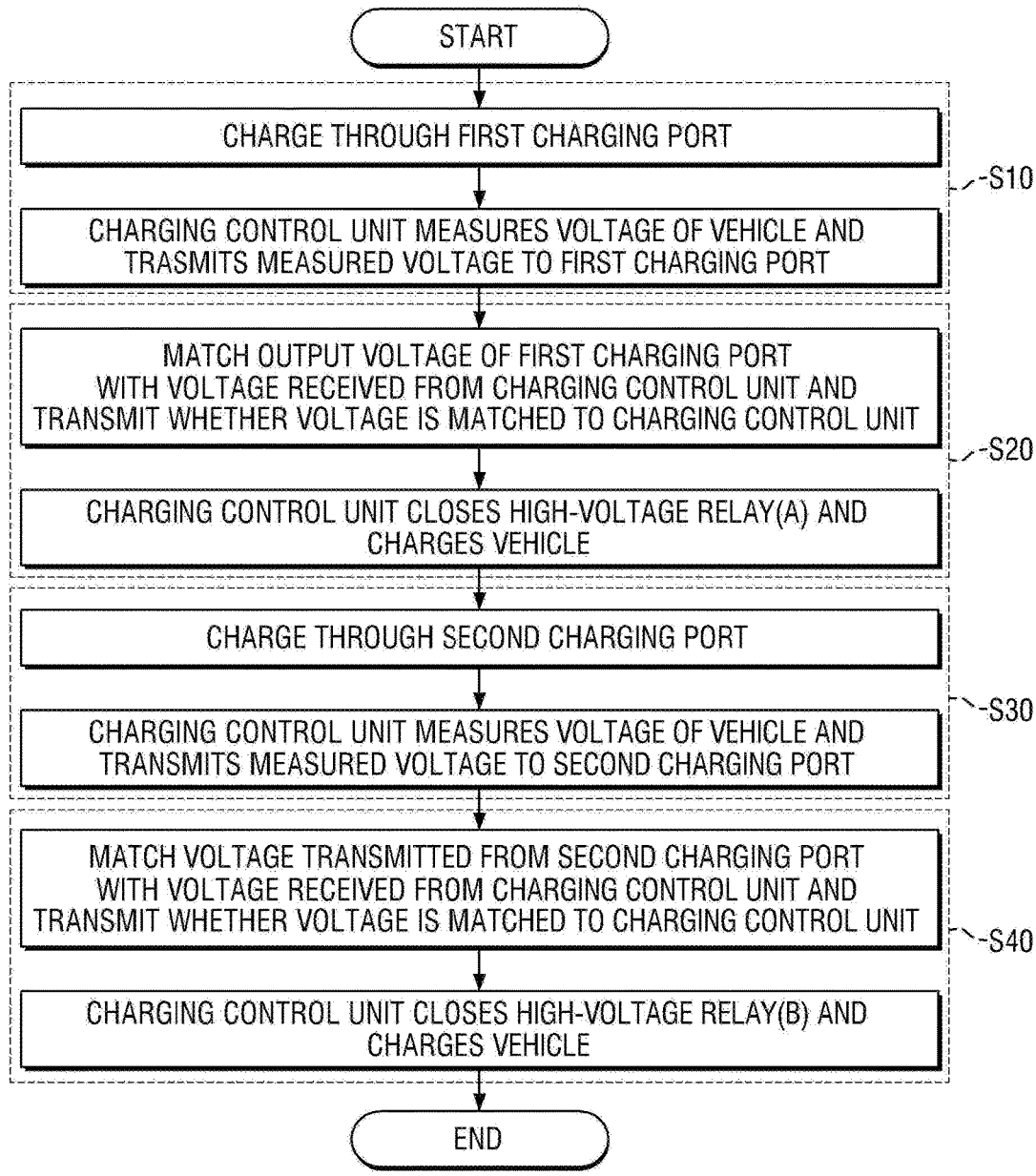
FIG. 4 is a flowchart of a method for controlling charging of a high voltage power grid structure of a vehicle according to an exemplary embodiment of the present invention.

FIG. 4 is a flowchart of a method for executing charging of a high voltage power grid structure of a vehicle according to an exemplary embodiment of the present invention. Referring to FIG. 4, the present invention may include first to fourth steps.

In the first step, the charging controller may be configured to measure battery voltage of the vehicle and transmit the measured voltage to the first charger and in the second step, output voltage of the first charger may be matched to voltage transmitted from the charging controller and matching of the voltage may be output in a notification to the charging controller. In the third step, the charging controller may connect the high-voltage relay to be connected to the first charging port to perform charging of the vehicle (S10 and S20). In the fourth step, while the vehicle is being charged, the charging controller may be connected to the second charging port to which the second charger is coupled as a charging port connected in parallel to the first charging port to repeat a process of first to third steps between the charging controller and the second charger (S30 and S40).

In the first step, the charging may be started through the first charging port and a charging step may be performed according to a predetermined procedure and current battery voltage of a vehicle-side power grid may be measured and a notification related thereto may be output or provided to the charger. Additionally, the vehicle charging output voltage may be matched with the voltage provided by the charging controller at the same level on the side of the charger.

In the second step, the supply voltage of the first charging port and the supply voltage of the charging controller may be matched with each other to thus prevent spark with the charging port additionally connected in parallel. Since the voltage notified to the charging controller in the first step and the voltage provided to the charging controller in the second step may be different from each other, a high-voltage relay A may be closed with respect to the notified charging port based on the voltage provided to the charging controller in the first step and the voltage provided to the charging controller in the second step. In particular, the second charging port may be configured to start actual charging current supply and there is no potential difference between the output voltages of the vehicle and each charging port, thereby preventing the spark and the inrush current.

The charging controller may be connected to the first charging port to connect the second charging port or the N-th charging port during charging. Even when the N-th charging port is connected to the charging controller, the process of first to third steps described above may be repeated.

Figure 5:
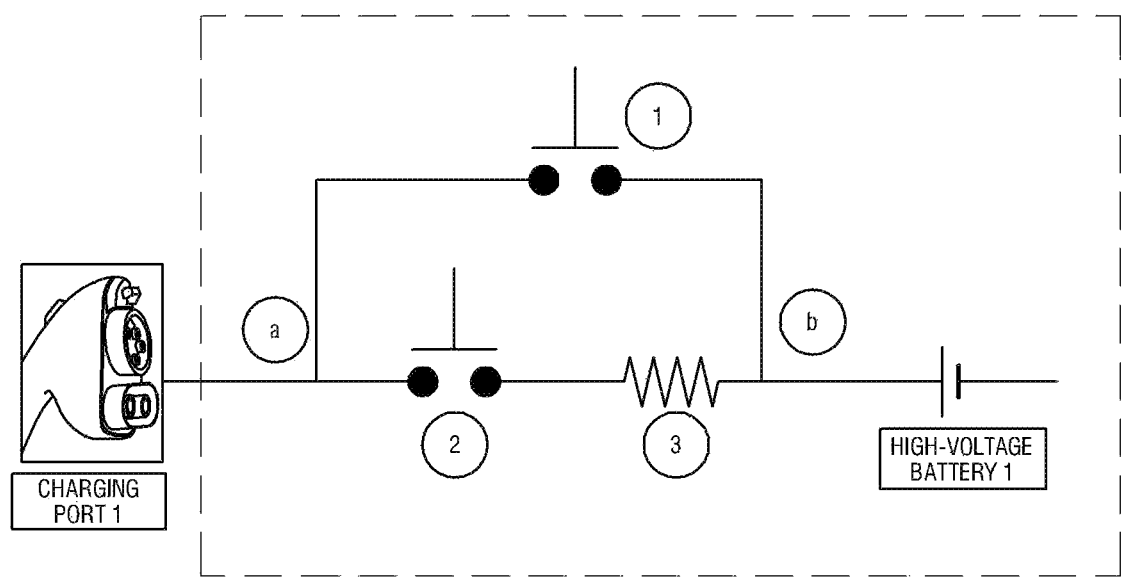
FIGS. 5 to 7 illustrate an exemplary embodiment of a high voltage power grid structure of a vehicle according to an exemplary embodiment of the present invention.
Figure 6:
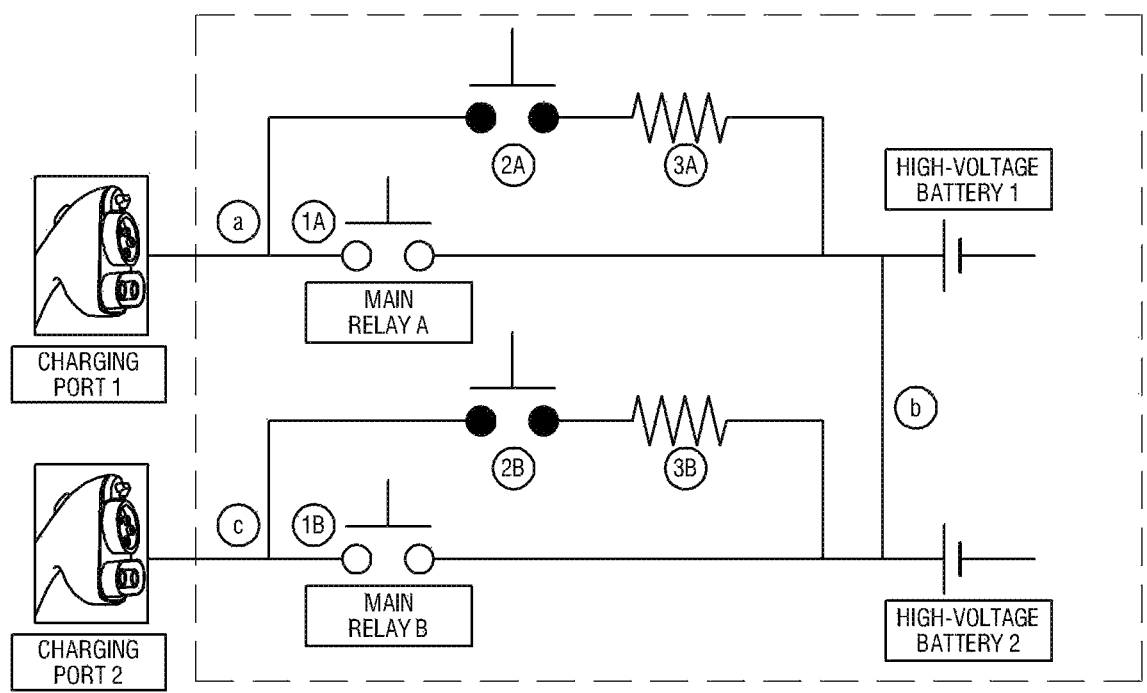
Figure 7:
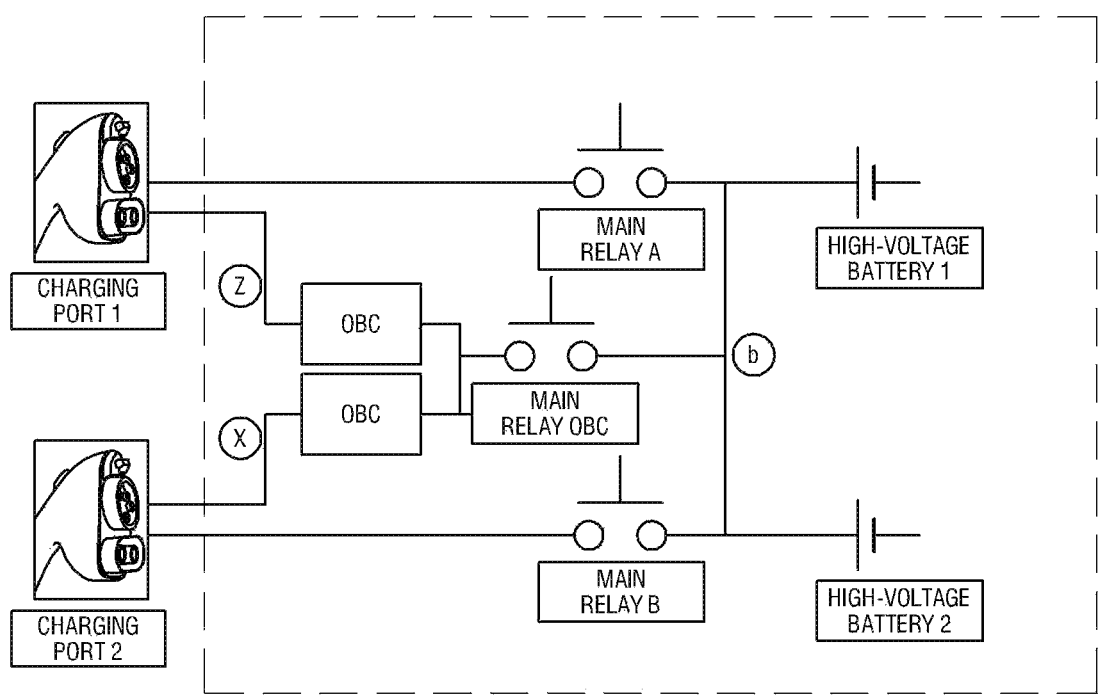

FIGS. 5 to 7 illustrate another exemplary embodiment of a high voltage power grid structure of a vehicle according to another exemplary embodiment of the present invention. Referring to FIG. 5, a circuit structure for solving a spark generation problem at the time of closing the relay is illustrated and relay #② having resistance to high voltage is first attached to supply charging port power.

Further, the spark generated at this time may be suppressed and absorbed by resistance Once this process is completed, ⓐ and ⓑ have the same potential. Accordingly, thereafter, even though relay #①  is attached, there is no problem in spark generation. Once a main power supply circuit is formed through relay #①, relay #② may be opened, thereby performing continuous power supply. The sequence may be performed in the order of ① pre charge relay CLOSE(→pre charge resistor)→② main relay CLOSE→③ pre charge relay OPEN. The structure of FIG. 5 may be applied to high-voltage relays A and B of FIG. 2.

Referring to FIG. 6, a two-port charging system is configured using a technique of FIG. 5. First, when the power supply is attempted through the first charging port, relay #2A having resistance to high voltage may first be attached to supply the charging port power. The spark generated at this time may be suppressed and absorbed by resistance '3A'. Once this process is completed, ⓐ and ⓑ have the same potential. Accordingly, thereafter, even though relay #'1A' is attached, there is no problem in spark generation. Once the main power supply circuit is formed through relay #'1A', relay 2A may be opened, thereby performing continuous power supply. In this situation, if power is supplied through charging port 2, processes of '2B' relay CLOSE '1B' relay CLOSE '2B' Relay OPEN may be performed.

The high voltage power grid structure of a vehicle may include: a first main relay connected in series between a first charging port and a first high-voltage battery; a first relay connected between the first charging port and the first high-voltage battery in parallel to the first main relay; a second main relay connected in series between a second charging port and a second high-voltage battery; and a second relay connected between the second charging port and the second high-voltage battery in parallel to the second main relay. The first relay and the second relay may further include resistors connected in series. The first relay may be operated first and then the first main relay may be operated or the second relay may be operated first and then the second main relay may be operated and positive electrodes of the first high-voltage battery and the second high-voltage battery may be connected.

In the case of FIGS. 5 and 6, since two relays and two resistors that withstand the high voltage need to be attached, cost and weight may increase. Referring to FIG. 7, the PRECHARGE RELAY and the PRECHARGE RESISTOR may be deleted based on an on board charger (OBC) to solve the problem, so that it may be advantageous in terms of cost/weight. In the case of a slow charge compared to the basic invention, the charging control method may further include a step of measuring the potential of point 'b' and providing the measured potential to the OBC, a step of matching the output voltage of the OBC to point 'b' equally, and a step of closing the main relay 'OBC', in the vehicle.

The high voltage power grid structure of a vehicle may include: a first main relay connected in series between a first charging port and a first high-voltage battery; a second main relay connected in series between a second charging port and a second high-voltage battery; and an OBC relay in which each of the first charging port and the second charging port is connected to an on board charger (OBC) and respective OBCs are commonly connected and the OBC relay may be commonly connected between the first main relay and the first high-voltage battery and between the second main relay and the second high-voltage battery. An OBC connection structure of FIG. 7 is not limited only to the circuit disclosed in the exemplary embodiment of the present invention and may be additionally configured as necessary.

Referring to FIG. 7, it may be possible to provide the second charging port during the slow charging through the first charging port according to an exemplary embodiment of the present invention. When rapid charging is attempted through the second charging port, the procedure disclosed in the present invention may be performed and the potential at point b may be provided to charging port 2 (à), the voltage of charging port 2 may be adjusted (à), and main relay 'B' may be closed in sequence.

Therefore, the PRECHARGE relay and the PRECHARGE resistor are not configured and the second charging port may be charged slowly/rapidly. A user may perform charging with all combinations without distinguishing whether the charger is connected to the charging port early or later and slowly or rapidly.

Although the present invention has been described in detail through the representative exemplary embodiment hereinabove, it will be appreciated that various modifications of the exemplary embodiment of the present invention can be made by those skilled in the art within a limit without departing from the scope of the present invention. Therefore, the scope of the present invention should not be determined to be limited to the exemplary embodiment and should be defined by appended claims to be described below and all changed or modified forms derived from equivalent concepts to the appended claims.

What is claimed is:

1. A method for controlling charging of a high-voltage power grid structure of a vehicle, comprising:
   measuring, by a charging controller, a battery voltage of the vehicle and transmitting the measured voltage to a first charger;
   matching an output voltage of the first charger with the voltage transmitted from the charging controller and providing the matching of the voltage to the charging controller via communication between the charging controller and the first charging port to which the first charger is coupled;
   performing, by the charging controller, charging of the vehicle by connecting a high-voltage relay to be connected to a first charging port to which the first charger is coupled; and
   repeating, while the vehicle is being charged, the method between the charging controller and the second charger by connecting to a second charging port, wherein a second charger is coupled to the second charging port and the second charging port is connected in parallel to the first charging port in parallel.

2. The method of claim 1, wherein spark with a charging port additionally connected in parallel is prevented by matching supply voltages of the first charging port and the charging controller.

3. The method of claim 1, wherein the charging controller is connected to the first charging port to connect the second charging port or an N-th charging port during charging.

4. The method of claim 3, wherein even when the N-th charging port is connected to the charging controller, the method is repeated.

5. A method for controlling charging of a high-voltage power grid structure of a vehicle, comprising:
   measuring, by a charging controller, a battery voltage of the vehicle and transmitting the measured voltage to a first charger;
   performing, by the charging controller, charging of the vehicle by connecting a high-voltage relay to be connected to a first charging port to which the first charger is coupled;
   matching the voltage of the first charging port with the voltage transmitted from the charging controller and providing the matching of the voltage to the charging controller via communication between the charging controller and the first charging port; and repeating, while the vehicle is being charged, the method between the charging controller and the second charger by connecting to a second charging port to which a second charger is coupled, wherein the second charging port is connected in parallel to the first charging port.

6. The method of claim 5, wherein spark with a charging port additionally connected in parallel is prevented by matching supply voltages of the first charging port and the charging controller.

7. The method of claim 5, wherein the charging controller is connected to the first charging port to connect the second charging port or an N-th charging port during charging.

8. The method of claim 7, wherein even when the N-th charging port is connected to the charging controller, the method is repeated.

9. An apparatus for controlling charging of a high-voltage power grid structure of a vehicle through multiple charging ports, comprising:
- a first high-voltage charging relay connected in series to a first charging port;
- a second high-voltage charging relay connected in series to a second charging port; and
- an N-th high-voltage charging relay connected in series to an N-th charging port,
- wherein the first high-voltage charging relay, the second high-voltage charging relay, and the N-th high-voltage charging relay are connected in parallel and connected in series to nodes to which multiple high-voltage battery packs are connected in parallel.

10. The apparatus of claim 9, wherein the high-voltage battery pack and a high voltage junction box (HV JBOX) are connected in series by a high-voltage cable and wherein the HV JBOX includes:
- a first high-voltage relay connected in series to a first charging port; and
- a second high-voltage relay in series connected to a second charging port,
- wherein the first high-voltage relay and the second high-voltage relay are connected in parallel and connected in series to the high-voltage cable, and
- wherein the high-voltage battery pack further includes:
- a first high-voltage battery pack,
- a second high-voltage battery pack connected in parallel to the first high-voltage battery pack,
- a first battery controller configured to operate the first high-voltage battery pack, and
- a second battery controller configured to operate the second high-voltage battery pack.

11. The apparatus of claim 10, further comprising:
- a charging controller configured to execute charging of the first charger and the second charger via communication with the first battery controller and the second battery controller.

12. The apparatus of claim 9, comprising:
- a first high-voltage charging relay connected in series between a first charging port and a first high-voltage battery;
- a first relay connected between the first charging port and the first high-voltage battery in parallel to the first high-voltage charging relay;
- a second high-voltage charging relay connected in series between a second charging port and a second high-voltage battery; and
- a second relay connected between the second charging port and the second high-voltage battery in parallel to the second high-voltage charging relay, and
- wherein the first relay and the second relay include resistors connected in series.

13. The apparatus of claim 12, wherein the first relay operates prior to the first high-voltage charging relay or the second relay operates prior to the second high-voltage charging relay.

14. The apparatus of claim 12, wherein when the first charging port is connected, the first relay is closed and then the first high-voltage charging relay is closed and then the first relay is opened again, and when the second charging port is connected, the second relay is closed and then the second high-voltage charging relay is closed and then the second relay is opened again.

15. The apparatus of claim 9, further comprising:
- an on board charger (OBC) relay in which each of the first charging port and the second charging port is connected to respective on board chargers (OBCs) and to which the respective OBCs are commonly connected,
- wherein the OBC relay is commonly connected between the first high-voltage charging relay and the first high-voltage battery and between the second high-voltage charging relay and the second high-voltage battery.

* * * * *